July 10, 1951

M. H. M. L. RAMAIN

2,560,305

PROCESS AND APPARATUS FOR AUTOMATIC SEVERING OF
SHEETS FROM A BAND OF GLASS

Filed Oct. 26, 1948

Inventor
MICHEL HENRY MARIE LOUIS RAMAIN

By

ATTORNEY

July 10, 1951  M. H. M. L. RAMAIN  2,560,305
PROCESS AND APPARATUS FOR AUTOMATIC SEVERING OF
SHEETS FROM A BAND OF GLASS
Filed Oct. 26, 1948  5 Sheets-Sheet 4

Inventor
MICHEL HENRY MARIE LOUIS RAMAIN

By

ATTORNEY

Patented July 10, 1951

2,560,305

UNITED STATES PATENT OFFICE 2,560,305

PROCESS AND APPARATUS FOR AUTOMATIC SEVERING OF SHEETS FROM A BAND OF GLASS

Michel Henry Marie Louis Ramain, St. Ingbert, Territory of the Saar, assignor to Societe Anonyme des Manufactures des Glaces et Produits Chimiques de Saint-Gobain, Chauny & Cirey, Paris, France Application October 26, 1948, Serial No. 56,617
In France October 29, 1947

19 Claims. (Cl. 49—48)

My invention has for its object a method and a mechanism which enable the entirely automatic manufacture of rectangular glass sheets of trade sizes from an upwardly moving continuous band.

The method consists in providing the automatic succession of the different operations comprising the transversal severing of a glass sheet from the upwardly moving band, the turning of the sheet to a horizontal position, its delivering to a cutting table, its proper positioning on the table and its final cutting to its trade rectangular shape, these different operations being so associated to one another that mechanical means actuated by one of the operations preceding the final cutting orientates the sheet brought into horizontal position on the table in such a manner that the transverse edges of the sheet become perpendicular to the direction along which the cutting tools are moved for the final cutting.

The principal advantage of my invention is to permit the automatic carrying out of all the cutting operations owing to the intervention of the mechanical means orientating the sheet before its final cutting.

Particularly for cutting sheets during the vertical rising of the band there may be used simple and solid devices provided with a tool moving transversely to the band on a fixed path and at a constant speed. It is known that in such devices, in order to obtain a horizontal scoring, that path must be slightly inclined in respect to the horizontal by reason of the continuous rising of the band while the tool moves.

It is also known that it is sometimes necessary to vary the rising speed of the band either for regulating the thickness of the sheet or for taking account of eventual variations of the viscosity of the glass mass being drawn.

As a result of such speed variations the cutting scores will not be always rigorously perpendicular to the longitudinal axis of the band and consequently the transverse edges of the sheets will not always be perpendicular to their longitudinal axis.

When my method is not used such sheets will by themselves be positioned on the final cutting table in such a way that their transverse edges will not be always perpendicular to the path of the cutting tools. The sheets so produced would not be perfectly rectangular.

The accompanying drawings show a mechanism for carrying out the invention, given as a mere example and without any limitative character.

Referring to these drawings in which corresponding parts are designated by corresponding marks of reference.

The continuously formed glass band I is drawn upwardly from the device 2 by which it is formed (which may be of any approved known type) by the traction rollers 2' and its upper end 3 passes into a cradle 4 through a channel 4a limited by the driven rollers 5, 5'—6 and 6' carried by the cradle which exert pressure on the glass band while in the cradle. These rollers are provided with ratchets (not shown) so as to hold a sheet separated from the band and prevent this sheet from going down after its separation.

As the band moves upwardly in the channel it will, at a proper time, dependent on the height at which it may be adjusted, pass the trigger roller 11 carried by the crank arm 11a and shift the latter to close an electrical circuit by which a scoring tool 13 of the proper kind will be moved transversely of the band so as to trace a substantially horizontal track or line across one face of the glass band 3 from edge to edge, the band being held up against the pressure of the cutter 13 by a roller 14. As the band is moving vertically while the cutter is moving substantially horizontally, the scoring of the band so effected will not be at right angles to the axis of the band but will be oblique thereto. Even if the cut were made diagonally of the sheet while it is moving in an effort to compensate for such movement, the scoring of the band would not necessarily always be at right angles to the axis of the band or strip due to the fact that the speed of travel of the sheet may vary.

Figure 1:
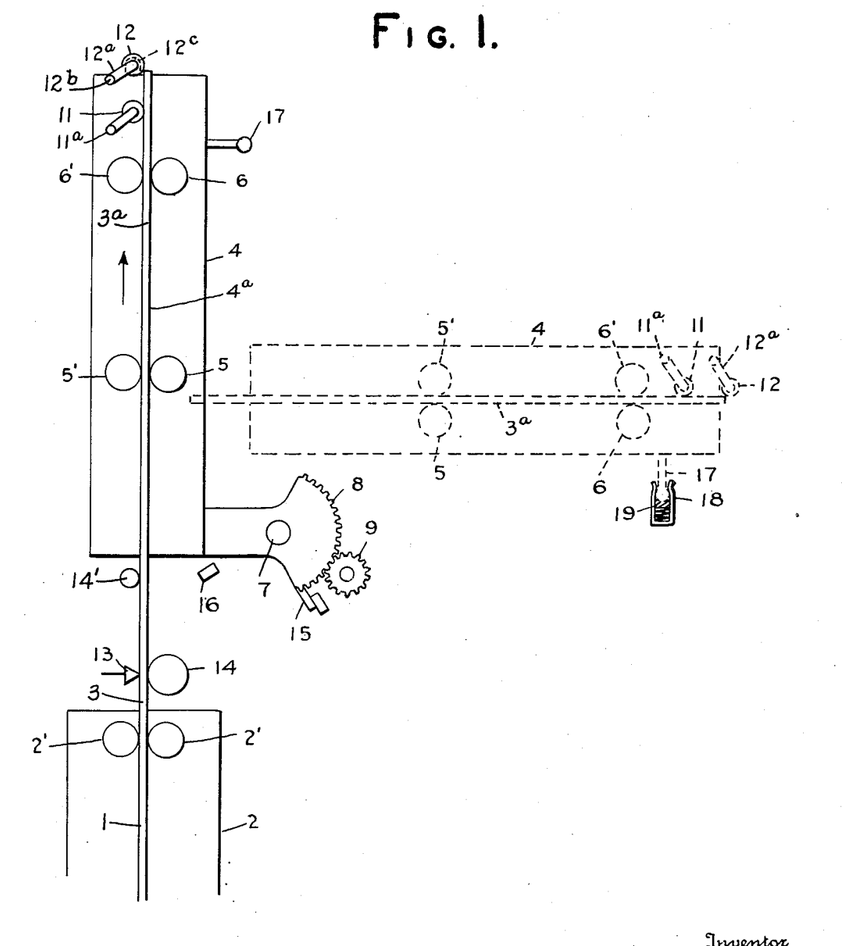
Figure 1 is a side elevation showing the mechanism by which a sheet is cut from an upwardly moving band of glass and by which the sheet is laid down to a horizontal position in accordance with this invention.

At a later stage in the upward movement of the band, its upper end will shift the trigger roller 12 carried by the crank arm 12a in a bearing 12c in the cradle and displace the same laterally. This closes the electrical circuit of a reversible motor to drive the pinion 9 meshing with a rack on the arm 8 and thus turn the cradle to the horizontal position shown in dotted lines in Figure 1. This turning movement of the cradle is arrested by the lug 15 on the arm 8 contacting with a member 16 which shifts the electrical connection of the motor drive circuit, leaving the cradle stationary in a horizontal position.

As the cradle arrives at the horizontal position, a headed projection 17 on the then lower side thereof enters between the jaws of a catch 18 provided with a cushioning base 19, thus bringing the cradle to rest without jar and holding it there while the sheet contained therein is delivered therefrom at the same time the lug 15 contacts with the stop 16 to close the circuit of the reversing switch to its cradle lifting position.

Located adjacent to, but separated from the free end of the cradle when lowered, is a fixed cutting table 20 (see Fig. 2) the upper face of which is slightly below the level of the channel 4a. Above the table longitudinally travels a bar 21, forming a tool carrier, carried on legs 22 having sleeves 23 sliding on guard rods 24 extending lengthwise of the table on each side thereof. Each leg extends downwardly below its supporting rod where it has a vertical slot 29 into which takes a lug 28 projecting laterally from an endless driven chain 25 passing over the two wheels 26 and 27 located at the opposite ends of the table. Thus on the movement of the chains, with the parts in the position shown in Figure 2, the lug 28 will pass around the wheel 27 and become associated with the lower run of the chain, this movement around the wheel resulting in a slowing down of travel and finally in reversal. The drive of the chain is such that it makes two complete revolutions for each complete cycle of movement of the cradle and thus causes the bar 21 to travel twice in each direction, the movement in one direction being due to the fact that the driving lugs 28 are on the upper runs of the chains, while when the lugs have by the rotation of the chains, become projected from the lower run thereof the bar will move in the opposite direction. To permit this the slot 29 is elongated sufficiently to permit the lug to slide therein when passing around the wheels 26 and 27. The wheel 26 or 27 will be driven by the motor 107, its circuits being controlled in the manner hereinafter described.

The travelling bar 21 has a normal position of rest at that end of the table remote from the cradle (which end will be hereinafter called the right) and the chain is set in motion to move the bar 21 to the left by a contact closed by the member 16 which at the same time opens the circuit of the motor 100 driving the pinion 9.

With this arrangement the sequence of operation is that after the cradle is lowered with the upper end of a band of glass therein that band will by the bending thereof at the scored zone against the roller 14', be broken, leaving a sheet 3a of glass in the cradle to be lowered to a horizontal position while being held in the cradle by the rollers 5, 5', 6, 6'. In order correctly to secure this fracture of the band, the height of the shaft 12b in the cradle 4 is adjusted so that the tilting of the cradle 4 only takes place at the moment when the cutting trace on the band arrives above the level of a roller 14' disposed on the same side of the glass band 1 as the cutting trace. This roller prevents lateral displacement of the band towards the left under the action of the tipping motion of the terminal of the band and this facilitates fraction along the cutting trace. The travelling bar is then moved to the left, see Fig. 2, i. e., towards the cradle. At the end of this movement tongs carried by the bar will engage the end of the sheet 3a which has emerged from the channel in the cradle and is above the left hand end of the table.

Figure 2:
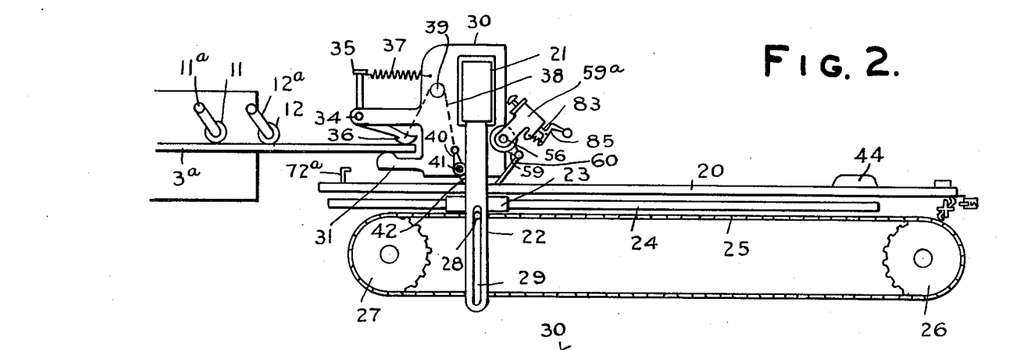
Fig. 2 is a side view of the cutting table for receiving the sheet delivered by the mechanism shown in Figure 1 and of certain mechanisms associated therewith.
Figure 3:
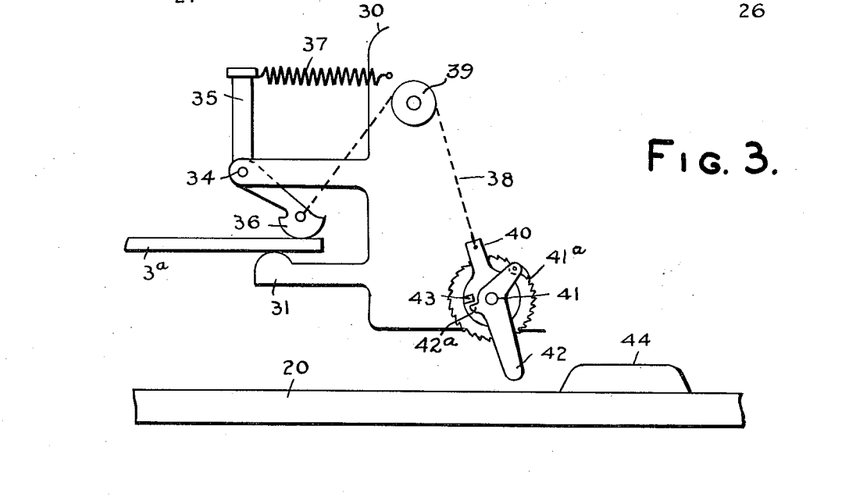
Fig. 3 is a detail view in side elevation of the traction mechanism for drawing the sheet onto the cutting table.

The tongs referred to, see Figs. 2 and 3, have two jaws, the lower one, 31, of which is fixed in a frame 30 carried by the cross bar 21 and the other of which, 36, which is pivoted at 34 to the frame and is pressed to close by a spring 37 attached to its arm 35 and the frame 30. With this construction the end of the glass projecting from the cradle will enter between the jaws so that on the reverse movement of the cross bar, i. e., towards the right, the sheet of glass will be drawn from the cradle and over the top of the table.

Figure 4:
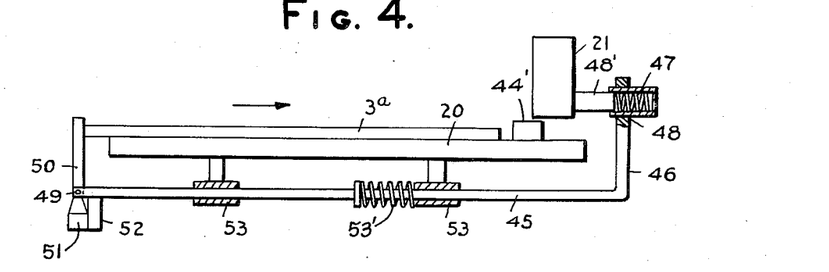
Figs. 4, 5 and 6 are details showing successive positions of a sheet on the cutting table and the instrumentalities by which a change of its orientation is accomplished.
Figure 5:
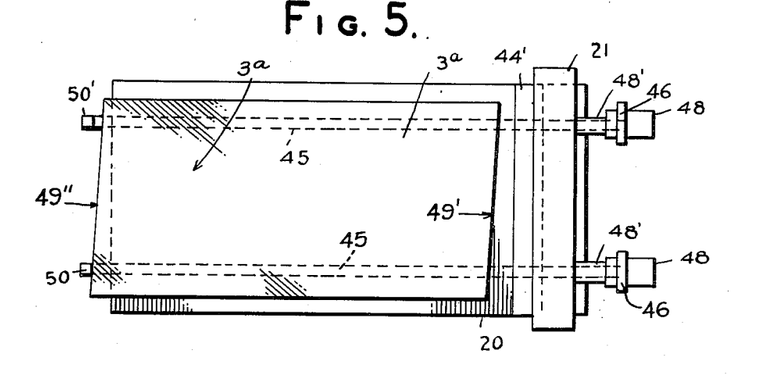

As the cross bar 21 approaches the right hand end of the table a detent 42 (see Fig. 3) rotatable on the shaft 41 encounters a cam 44 on the table 20 and is thereby turned. In turning, a projection 42a on the detent drives a pin 43 projecting from the side of a lever 40, free to move on the shaft 41, and turns such lever to exert traction on the chain 38 passing over the pulley 39 on the frame 30 and connected to the movable jaw 36 and thus lifts the latter to release the bite of the tongs on the sheet. The continued movement of the cross head to the right then withdraws the lower jaw 31 from beneath the end of the sheet, which drops to rest on the table with its left or rear end projecting over the left end of the table (see Fig. 4).

When the sheet has been deposited on the table as above described, its longitudinal axis will be parallel to the long edge of the table, but it happens that its transverse edges 49' and 49'' would be somewhat oblique thereto for the reasons above mentioned. As the cutting tools of the table run parallelly to its longitudinal axis, their working action would result in a non rectangular sheet. For avoiding these drawbacks, and according to my invention, I place the transverse edges of the sheet square with the longitudinal axis of the table. This requires a slight rotation of the sheet on the table and is effected as follows:

Below each side of the table is a longitudinal rod 45 sliding in guides 53 and each terminating at its right end in a riser 46 and pressed towards the left by the spring 53'. In a shell 48 in the top of each riser is a plunger 48' pressed to the left by a spring 47. The left hand end of the rods are connected at 49 to the lower portions of levers 50 and 50' located at the corners of the left hand end of the table and having weighted lower ends 51 normally resting against the fixed abutments 52. The rods 45 are spring pressed towards the right by the springs 47, thus throwing the ends of the levers 50 and 50' to the right of the end of the table, when the plungers 48' are pushed by the bar 21.

Figure 6:
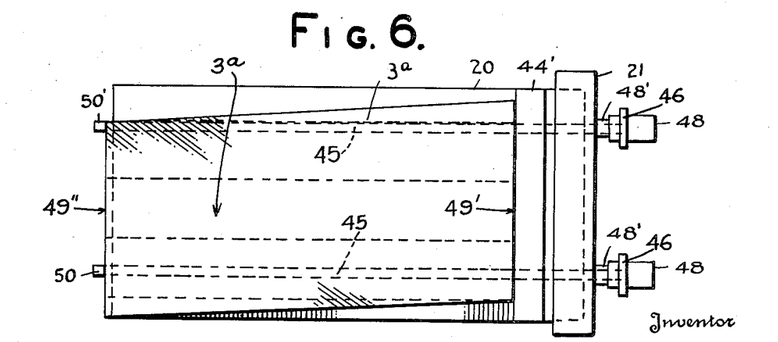

As the sheet is drawn over the table it passes over the upper ends of the levers 50, coming to rest with its left hand end to the right thereof and projecting over the left end of the table. The continued movement of the tool carrying cross bar 21 after the sheet has been released and dropped, pushes the push rods 48' and rods 45 towards the right and thus pulls the upper ends of the levers 50, 50' against the projecting end of the sheet and shoves it as a whole towards the right. This advance of the sheet first causes its forward corner to contact an abutment 44' on the table and the sheet then turns on that corner under the pressure of the spring 47 on the opposite side of the table, until the oblique end of the sheet lies snugly against the abutment (see Fig. 6). This shifts the longitudinal axis of the sheet to an acute angle to that of the table and in position to be cut along dotted lines shown in Fig. 6 by cutters carried on the tool carrying cross bar.

Figures 7, 8, 9:
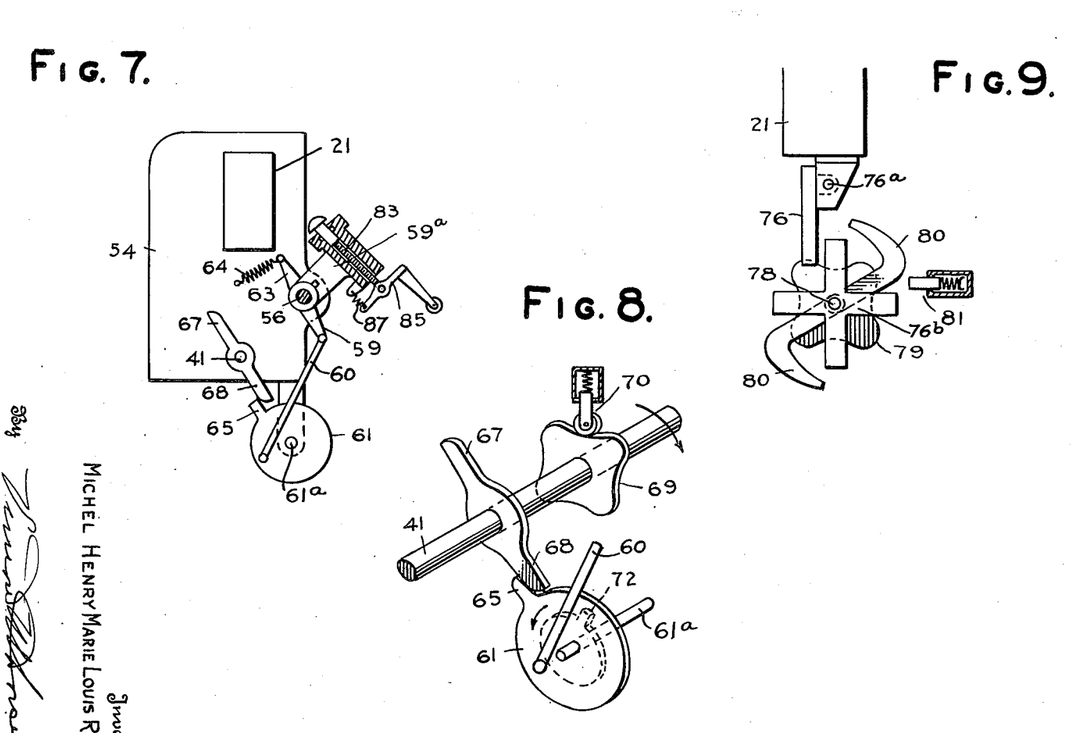
Fig. 7 is a vertical longitudinal section showing the method of mounting the glass cutters.
Fig. 8 is a detail perspective view for lowering and raising the cutters onto and from the glass.
Fig. 9 is a detail of the automatic stop mechanism for the travelling tool carrier.

Mounted on the cross bar or tool carrier 21 intermediate of its ends is a frame 54 (Figure 7) carrying the sheet cutting mechanisms, a shaft 56 extending therethrough from side to side, the individual cutters being splined or otherwise attached to the shaft so as to slide lengthwise thereon in accordance with the width of the strips into which it is desired to cut the sheet. The cutters are brought into working relation with the sheet by a partial turn of the shaft 56 on the completion of that movement of the cross bar towards the right that follows the first left hand movement from its position of rest at the right hand end of the table and directly following the deposit of the sheet on the table and are lifted off the sheet by the arrival of the cross bar 21 at the end of the cutting stroke. To give the desired angular oscillation to the shaft 56 it has keyed thereto the crank arm 59 connected by a pitman 60 with a disk 61 rotating around its mounting pin 61a carried by the frame 54 and provided with a peripheral lug 65 as is shown in Figure 7. Alternately coacting with the lug 65 are the two diametrically disposed arms 67 and 68 fast on the shaft 41 before referred to and on which is journaled the tappet or detent 42. A suitable ratchet drive 41a is interposed between the tappet and the shaft 41 so that, due to the length of the tappet and the rise of the cam abutment 44, the shaft will be rotated through an arc sufficient for the St. Andrew's cross 69, see Fig. 8, fast on the shaft 41 and its cooperating spring pressed roller 70 to carry the shaft 41 through a rotation of 90 degrees. Thus the shaft will make a half revolution for each complete two movements of the bar 21 along the table. In the relation of the parts shown in Figure 7 this rotation will, by the action of the arm 68 on the lug 65, rotate the disk 61 sufficiently to carry the pitman past its dead center position, thereby oscillating the arm 59 and turning the shaft 56 to depress the cutting mechanisms carried thereby. The mechanisms will continue depressed until the tool carrying cross bar 21 reaches the left hand end of its travel when a lug 72 on the inner side of the disk 61 will encounter a proper abutment 72a, see Fig. 2, on the table 20 thus turning the disk 61 back to the position shown in Figure 7, it being held normally in that position by the spring 64 one end of which is attached to an arm 63 fast on the shaft 56 and the other end attached to the frame 54.

The above depression of the cutters is thus due to the cross bar 21 completing its movement to the right by which movement a sheet is laid on the table. At the end of the next movement to the right the other arm 67 is positioned adjacent to the lug 65, but without contacting therewith and on the second movement to the right the arm 67 is rotated to move the disk and to again depress the cutters.

Each cutter is pivoted to a separate arm 59a keyed to and sliding on the shaft 56, the pivot being in a lever 85 carrying the cutter and in the end of an adjustable screw 83 working in the head of the arm 59a and is pressed towards the glass by a spring 87. By adjusting the screw 83 of each cutter the pressure of that cutter on the sheet may be adjusted.

Each time the cross bar reaches its end position to the right a dog 76 pivoted at 76a on and dependent from the bar 21 (see Fig. 9) contacts with the end of one of the four arms of a cross 76b keyed on the shaft 78 mounted on the lower side of the table 20 at the right end thereof and shifts such arm sufficiently to cause the St. Andrew's cross 79 fixed on the shaft and its accompanying centering roller to complete a 90 degree rotation of the shaft. On the return stroke of the head to the left the dog clicks over the adjacent arm of the cross. Also fixed on the shaft 78 are two diametrical tappet arms 80, the two ends of which in their rotation are adapted to open the contact maker in the circuit of the motor driving the chain. As it requires four strokes of the cross bar to the right to complete a rotation of the shaft 78 and as there are two tappet arms it will be seen that the switch U will be opened only on every two complete cycles on the travel of the cross bar 21 and then only when such cross bar is at the right hand end of its travel.

Presuming the band of glass is continuously moving up and the cross bar 21 is at rest at the end of its travel to the right, the operation is as follows:

(1) The upward movement of the band shifts the roller 11 and causes the band to be scored by the band scorer 13 and further upward movement of the band shifts the roller 12 and closes the lowering circuit of the motor driving the pinion 9 and lowering the cradle to its horizontal position. In this movement of the cradle the band is broken at the roller 14' and a sheet 3a is thus separated from the upper end of the band.

(2) The lowering circuit of the cradle motor is broken by the lug 15 throwing the lever 16 and by such movement of the lever the circuit of the chain driving motor 107 is made thus causing movement of the cross bar to the left. This movement may be called the first left movement. At the end of this movement the tongs grasp the end of the sheet projecting from the cradle.

(3) The continued movement of the chains 25 carries the lugs 28 around the rollers 27 and reverses the travel of the bar to cause the first movement thereof towards the right, thus dragging the sheet over the table.

(4) During this movement, the sheet leaves the roller 11 which returns to its former position, and towards the end of this movement the sheet drops on the table 20 with the transverse trailing edge 49" of the sheet resting close to the vertical levers 50, 50', this drop releases the roller 12 which returns to its former position and closes the rising circuit of the motor driving the pinion 9 and erecting the cardle to its vertical position.

(5) Towards the end of the dragging movement of the sheet on the table, the tongs are loosened on the sheet and the rods 45 are shifted to the right actuating the levers 50, 50' to orient the sheet on the table.

(6) At the completion of this movement shaft 41 is rotated through 90 degrees and the cutters are lowered to the sheet level.

(7) The continued movement of the cross bar for a second time towards the left drags the sheet cutters over the sheet and the completion of this movement lifts the cutters.

(8) The further movement of the cross bar for its second travel to the right and at the end of this movement opens at 81 the circuit of the chain driving motor, to stop the travel of the cross bar.

(9) During the period of rest following this stoppage, the strips of glass into which the sheet may have been cut may be removed from the table.

Figure 10:
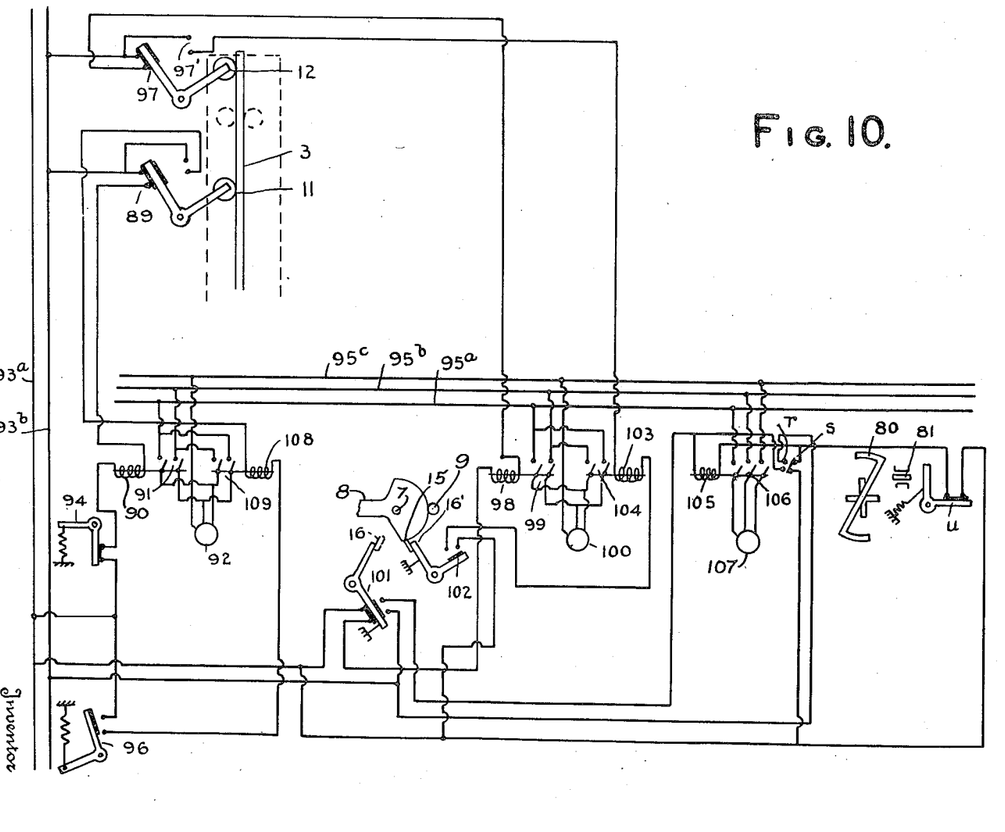
Fig. 10 is a wiring arrangement for the entirely automatic driving of the device.

The structures before described can be made entirely automatic for the severing of successive sheets by the wiring arrangement shown in Figure 10. In this figure, the trigger roller 11 shifted by the glass band 3 pushes the switch 89 to the position indicated on Fig. 10 for closing the circuit of the solenoid 90 which actuates the switch 91 of the motor 92 driving the scoring tool 13 of Fig. 1. The solenoid 90 being fed by the current of the feed line 93a, 93b through a circuit closed by the switches 89, 94 actuates the bipolar switch 91 which connects the two phases 95a, 95b of the triphase line 95a, 95b, 95c with the motor 92, on which the third phase 95c is permanently connected. Thus, the motor 92 moves the scoring tool 13 from its position in contact with the switch 96 as shown on Fig. 10 towards the switch 94 which is shifted at the end of this stroke of the scoring tool 13 and opens the circuit of the solenoid 90, thus releasing the switch 91: thus, the motor 92 stops and so does the scoring tool 13.

As soon as the end of the glass band 3 shifts the trigger roller 12, a switch 97 carried by the crank arm 12a closes the circuit which carries the current of the feeding line 93a, 93b to the solenoid 98, thus moving the switch 99 to its connecting position which feeds the current of the triphase line to the motor 100 meshed with the pinion 9 so that the cradle 4 is turned to its horizontal position. As the cradle is tilting, the lug 15 liberates the arm 16' of the switch 102 by which the energizing circuit of the solenoid 103 actuating the switch 104 for raising the cradle would be closed on the feeding line 93a, 93b if the switch 97 were not discarded from the position 97' by the presence of the glass band against the trigger roller 12. When the cradle 4 arrives to its horizontal position, the lug 15 contacts with the stop 16, thus moving the switch 101 which opens the circuit of the solenoid 98, thus the switch 99 is released to its opened position, the motor 100 is stopped and so does the cradle 4. Then the switch 101 closes the circuit which connects the line 93a, 93b through the switch s to the solenoid 105, which moves the switch 106 into the position connecting the line 95a, 95b, 95c with the motor 107 actuating the cross bar 21. That movement of the switch 106 closes the switch r and opens the switch s, but the circuit of the solenoid 105 continues to be closed through the switch u which shunts the switch s.

As soon as the glass sheet 3 has released the trigger arm 11, the switch 89 comes into the position closing the circuit feeding the solenoid 108 through the switch 96 which came into closing position when the scoring tool 13 was moved by the motor 92 towards the switch 94. The energization of solenoid 108 by the current of the line 93a, 93b drives the switch 109 to its position connecting the triphase line 95a, 95b, 95c and the motor 92 which moves the scoring tool 13 from the switch 96. When the switch 94 is shifted by the tool 13, it opens the circuit of the solenoid 108, the switch 109 is released, the motor 92 stops and so does the scoring tool 13.

As soon as the glass sheet 3 has been delivered to the cutting table 20, it releases the trigger roll 12 and the switch 97 secured to the latter comes to the position 97', thus closing the circuit which energizes the solenoid 103. Then, the switch 104 is moved to the position connecting the motor 100 which rotates the cradle 4 to its vertical position, thus releasing the lug 15 from the stop 16 and the switch 101 is carried back to the position shown on Fig. 10, opening the circuit of the solenoid 105; this movement would close the circuit of the solenoid 105 if the switch u were in its closing position, but that switch has been put to its opening position by the trigger 81 pushed by one of the tappet arms 80 at the end of the second stroke of the cross bar 21 to the right. In that condition, as no current passes through the solenoid 105, the switch 106 comes back to its opening position and the motor 107 stops and so does the cross bar 21, the switches r and s returning to their first positions indicated on Fig. 10.

As soon as the lug 15 hits the lever 16', the switch 102 opens the circuit of the solenoid 103, the switch 104 returns to its opening position, the motor 100 stops and so does the cradle 4 which has just arrived in its vertical position. A new upper end of the glass band which has been continuously rising after the severing of the former glass sheet, passes between the guiding rollers 5, 5' and when it raises the trigger roller 11, a new succession of the above indicated movements will begin as above described.

Having thus described my invention, what I claim is:

1. A method for automatically cutting rectangular glass sheets of trade sizes from an upwardly moving band which consists in effecting the successive operations of transverse severing of a sheet from the upwardly moving band, turning the sheet to a horizontal position, delivering it to a cutting table, shifting the sheet on the table before its final cutting so that its transverse edges will be placed square to the longitudinal axis of the table and cutting the long edges of the sheet parallelly to said longitudinal axis.

2. The combination with means for upwardly feeding a band of glass, of a cradle pivoted on a horizontal axis having a channel to receive the upper end of such band when the cradle is vertical, means for scoring the band transversely, means for turning the cradle from a vertical to a horizontal position, a cutting table adjacent to the free end of the cradle when horizontal, glass dragging tongs movable above the table, and means actuated by the movement of the cradle to horizontal position to move the tongs to engage the end of the glass in the cradle and to draw it therefrom and over the table.

3. The combination with means for upwardly feeding a band of glass, of a cradle pivoted on a horizontal axis having a channel to receive the upper end of such band when the cradle is vertical, means for scoring the band transversely, means for turning the cradle from a vertical to a horizontal position, a cutting table adjacent to the free end of the cradle when horizontal, means for moving the glass on the table lengthwise of the cutting table and means for shifting the orientation of glass on the table.

4. The combination with means for upwardly feeding a band of glass, of a cradle pivoted on a horizontal axis having a channel to receive the upper end of such band when the cradle is vertical, means for scoring the band transversely, means for turning the cradle from a vertical to a horizontal position, a cutting table adjacent to the free end of the cradle when horizontal, means for moving the glass on the table lengthwise of the cutting table and means for shifting the orientation of glass on the table in order to bring the transverse edges square to the longitudinal axis of the cutting table and to the travel of the cutting means.

5. The combination with means for upwardly feeding a band of glass, of a cradle pivoted on a horizontal axis having a channel to receive the upper end of such band when the cradle is vertical, means for scoring the band transversely, means for turning the cradle from a vertical to a horizontal position, a cutting table adjacent to the free end of the cradle when horizontal, tongs movable lengthwise of the table to draw the glass from the cradle and onto the table and means actuated by the completion of such movement of the tongs to shift the orientation of glass on the table.

6. The combination with a cutting table, of a travelling tool carrier moving lengthwise of the table, means carried by the carrier for drawing a sheet of glass onto the table when moved in one direction, cutters mounted on the tool carrier, and means for depressing the cutters onto the glass on the table of the following movement of the carrier in the opposite direction and to left them therefrom at the end of such movement.

7. The combination with a cutting table, of a travelling tool carrier moving lengthwise of the table, means carried by the carrier for drawing a sheet of glass onto the table when moved in one direction, means actuated by such movement of the carrier to change the orientation of glass on the table, cutters mounted on the tool carrier, and means for depressing the cutters onto the glass on the table on the completion of such movement of the carrier and to lift the cutters from the glass at the end of the following movement of the carrier in the opposite direction.

8. The combination with a cutting table, of a travelling tool carrier moving lengthwise of the table, means carried by the carrier for drawing a sheet of glass onto the table when moved in one direction, means actuated by such movement of the carrier to change the orientation of glass on the table, cutters mounted on the tool carrier, means for depressing the cutters onto the glass on the table on the completion of such movement of the carrier and to lift the cutters from the glass at the end of the following movement of the carrier in the opposite direction.

9. The combination with a cradle for separating a sheet of glass from a vertically moving band of glass and lowering it into a horizontal position adjacent to a cutting table, a cutting table, a tool carrier moving over the table and actuated by the turning of the sheet to make two complete cycles of movement over the table, tongs on the carrier engaging the horizontal sheet at the end of the first movement of the carrier towards the cradle and for then drawing the sheet over the table on the succeeding movement of the carrier away from the cardle, means for releasing the tongs near the end of the last named movement, means for changing the orientation of the glass on the table at the end of such movement, glass cutters mounted in the carrier, means for lowering the cutters on the sheet at the end of such movement and for lifting them therefrom at the end of a second movement of the carrier towards the cradle and means for stopping the carrier at the end of its second movement away from the cradle.

10. The combination with a cutting table, means for dragging onto the table in a predetermined path a sheet of glass with its ends oblique to the direction of the movement of such dragging means, an abutment on one end of the table, in the path of travel of the sheet and resilient means actuated by the dragging means to shove upon opposite rear corners of the glass on the table.

11. The combination with means for forming and feeding upwardly a band of glass, of a horizontal pivoted cradle receiving the band as former, scoring means, a motor to turn the cradle, means on the cradle actuated by the presence of glass adjacent thereto to drive the motor to lower the cradle, a reversing switch for the motor actuated by the cradle to reverse the motor circuits, means on the cradle actuated by the absence of glass adjacent thereto to close the lifting circuit of the cradle, a cutting table adjacent to the end of the cradle when horizontal, a tool carrier movable over the table, glass dragging, orienting, and cutting means movable with the carrier, the motor for moving the carrier lengthwise of the table, a switch in the last named motor circuit actuated on every other arrival of the carrier at the end of the table away from the cradle to open such motor circuit, and a pilot circuit around said last named switch containing the aforesaid switch closed by the absence of glass and a switch closed when the cradle is horizontal.

12. In a device for automatically cutting rectangular glass sheets from an upwardly moving band of glass, the combination with a cradle in vertical position for receiving the upper part of the glass band and separating a glass sheet thereon, means for transversely scoring the glass band, means for lowering the cradle into a horizontal position together with the sheet, a cutting table, a tool carrier moving over the table and actuated by the turning of the cradle to make two complete cycles of movement over the table, tongs on the carrier engaging the horizontal sheet at the end of the first movement of the carrier towards the cradle and for then drawing the sheet over the table on the succeeding movement of the carrier away from the cradle, means for releasing the tongs near the end of the last named movement, means for changing the orientation of the glass on the table at the end of and actuated by such movement, means for returning the cradle into its vertical position, glass cutters mounted in the carrier, means for lowering the cutters on the sheet at the end of such movement and for lifting them therefrom at the end of a second movement of the carrier towards the cradle and means for stopping the carrier at the end of its second movement away from the cradle.

13. The combination with means for continuously feeding a band of glass, of scoring means moving across the band, a motor actuating the scoring means, a cutting table, means for breaking the band where scored and laying the severed sheet on the cutting table, and means for shifting the sheet on the table to cause its severed end to be normal to the length of the table.

14. The combination with a cradle pivoted on a horizontal axis and when vertical receiving an upwardly moving strip of glass, means actuated by the presence of the glass on the cradle to lower the cradle to the horizontal, and by the absence of glass on the cradle to raise it to the vertical, a cutting table, means for shifting the sheet on the table to cause its severed end to be normal to the length of the table, a tool carrier movable over the table, a motor for moving the tool carrier through a plurality of complete movements lengthwise of the table when energized, a switch controlling the circuit of the said motor thrown to open position by the presence of the carrier at one end of one of its strokes and a switch in shunt to the first named switch and thrown to closed position by the absence of glass in the cradle.

15. In a device for severing a continuously upwardly moving band of glass into separate sheets, the combination with means for forming the band, of a cradle pivoted on a horizontal axis and provided with a channel to receive the successively formed ends of the band, means for scoring the band transversely, a trigger on the cradle located adjacent to the channel actuating the severing means, means actuated by the movement of the band in the channel for turning the cradle from its vertical position to a horizontal position, a cutting table, means to deliver the sheet to the cutting table and means for shifting the orientation of the sheet on the cutting table in order to bring its transverse edges perpendicular to the longitudinal axis of the cutting table.

16. The combination with a cradle pivoted on a horizontal axis and when vertical receiving an upwardly moving strip of glass, scoring means, means actuated by the presence of the glass on the cradle to lower the cradle to the horizontal, and by the absence of glass on the cradle to raise it to the vertical, a cutting table, means for shifting the sheet on the table to cause its severed end to be normal to the length of the table, a cutting tool carrier movable over the table, periodically operating means for moving the cutting tool carrier longitudinally of the table, means for maintaining said operating means inactive when the cutting tool carrier moves to one extremity of its movement over the table and means operated by the movement of the cradle to horizontal position for activating said operating means.

17. The combination with a cradle pivoted on a horizontal axis and when vertical receiving an upwardly moving strip of glass, scoring means, means actuated by the presence of the glass on the cradle to lower the cradle to the horizontal, and by the absence of glass on the cradle to raise it to the vertical, a cutting table, means for shifting the sheet on the table to cause its severed end to be normal to the length of the table, a cutting tool carrier movable over the table, periodically operating means for actuating the cutting tool carrier through a plurality of complete movements lengthwise of the table, means for maintaining said operating means inactive when the cutting tool carrier completes one of such movements and means operated by the movement of the cradle to horizontal position for activating said operating means.

18. In combination with means for delivering a sheet of glass having its transverse edges abnormal to its longitudinal axis, a cutting table, a cutting tool carrier movable longitudinally of said table, an abutment cooperating with the table normal to the longitudinal axis thereof and traversing the path of delivery of the glass to the table and means associated with the table for shifting said sheet of glass and one of its transverse edges into a position in contact with said abutment whereby the transverse edge so shifted will rest at right angles to the path of travel of said cutting tool.

19. An apparatus for cutting a continuous upwardly moving glass strip into separate sheets comprising a device for transversely cutting the strip of glass, a tilting cradle adapted to receive the strip and to bring the severed sheet from the vertical position to the horizontal position, means for gripping the sheet and transferring it from the cradle to the cutting table, means for shifting the orientation of the sheet on the cutting table in order to bring its transverse edge perpendicular to the longitudinal axis of the table, cutting members disposed above the table for longitudinal displacement, means for tilting the table operative by the travel of the glass strip in the cradle, and means operable in a predetermined order and time during the tilting movement of the table for actuating said gripping and transferring means, the means for shifting the sheet on the cutting table and said cutting members.

MICHEL HENRY MARIE LOUIS RAMAIN.

REFERENCES CITED

The following references are of record in the file of this patent:

UNITED STATES PATENTS

| Number | Name | Date |
|---|---|---|
| 1,996,387 | Owen | Apr. 2, 1935 |
| 2,111,393 | Gaskell | Mar. 15, 1938 |

FOREIGN PATENTS

| Number | Country | Date |
|---|---|---|
| 342,304 | Italy | 1936 |